Jan. 7, 1930. R. E. CALLER 1,742,753
APPARATUS AND METHOD FOR VENTILATING AUTOMOBILE BODIES
Filed Oct. 30, 1928
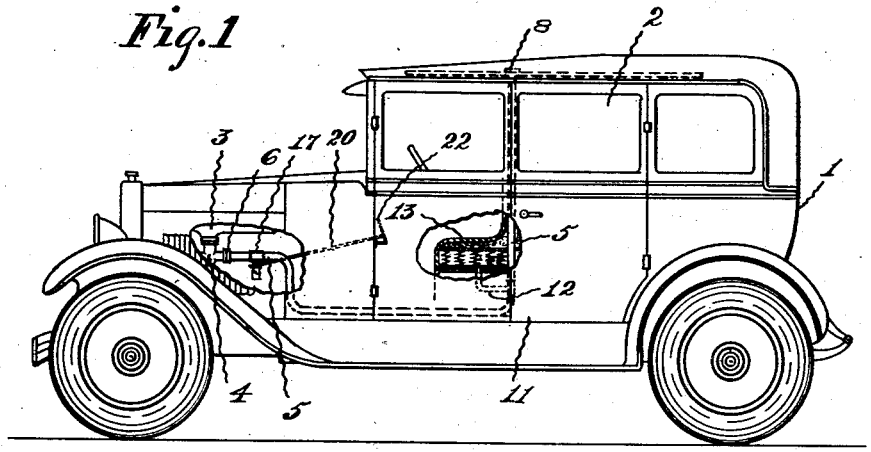
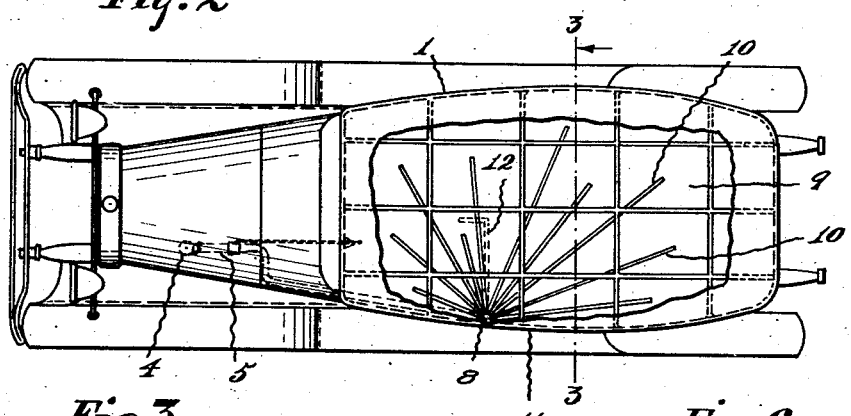
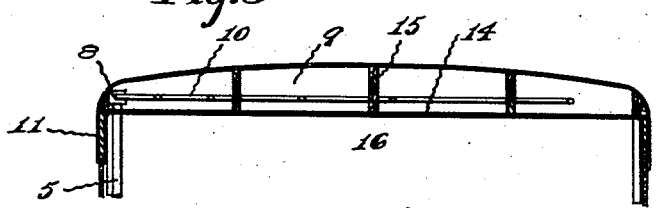
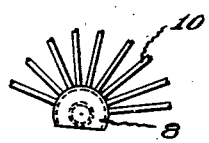 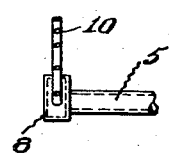 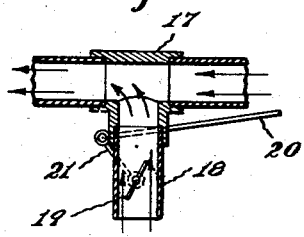
INVENTOR
Ramond E. Caller,
BY
Harold D. Penney
ATTORNEY Patented Jan. 7, 1930

1,742,753

UNITED STATES PATENT OFFICE

RAYMOND E. CALLER, OF NEW YORK, N. Y.

APPARATUS AND METHOD FOR VENTILATING AUTOMOBILE BODIES

Application filed October 30, 1928. Serial No. 315,969.

My present invention relates to ventilating and carburetting systems and devices for automotive vehicles and more particularly to a combination ventilating and carburetting system and apparatus for an automobile.

Years of automotive experience have proved that maximum comfort in riding in so-called closed cars, can only be attained by maintaining a constantly changing atmosphere within the car. Persons taking trips of any length in a limousine, sedan, coupé, or any automobile constructed to completely enclose the occupants will readily attest to the discomforts engendered by a poorly ventilated interior. Excess warmth, elevated humidity caused by the moisture exuded by the human body, gasoline and oil fumes, and exhalations of diversified character are but a few of the evils that rob the autoist of his pleasure. The present invention seeks to and does eradicate the above enumerated disadvantages in closed car riding.

Not only is the air within the closed car constantly replenished to the benefit of the autoist by my herein disclosed ventilating system, but simultaneously therewith, the efficiency of the fuel, gasoline in this case, vaporization is increased.

It is a well known fact that the warmer the air fed to the carburetor, the more perfect the vaporization of the gasoline. Also, it is extremely desirable to reduce the dust content of the air, consumed during the fuel vaporizing, to a minimum. In present day practice, the carburetor educes air from the hood space. Obviously the air lacks the freedom from foreign bodies that is desired under ideal conditions.

My system then has for its main object the utilization of cylinder suction of the automobile engine to constantly replenish the atmosphere within a closed car with fresh air and simultaneously eliminate foreign bodies from the withdrawn air and feed such withdrawn air to the carburetor of the engine whereby the autoist profits, due to increased comfort within the car, and higher carburetion efficiency under the hood.

Another object of my invention, which is by no means negligible, is the positive, inexpensive but effective ventilating system I have contrived in which the waste and exhausted air is not only rendered useful in carburetion, but is automatically filtered by any portion of the vehicle body construction to eliminate foreign bodies such as dust, minute particles of sand and many other similar substances.

Another object of my invention is to provide a control means in connection with the above mentioned ventilating system whereby the quantity of air withdrawn from the interior of a closed car may be controlled manually or otherwise.

Another object of my invention is to provide a manually controlled valve on a carburetor device which withdraws air from the interior of a closed car whereby air from the atmosphere may be directly supplied to the carburetor to diminish the quantity of air withdrawn from the car interior, thus eliminating discomfort due to too great an influx of cold air into the said interior when the automobile is travelling fast in cold weather.

Another object of my invention is to provide a system and apparatus for withdrawing the air from the passenger compartment of an automotive vehicle into the engine compartment of the vehicle by means of the cylinder suction of the engine in said compartment whereby a positive ventilation of said passenger compartment is secured and efficient carburetion of the engine fuel of said engine is secured.

And still another object of my invention is to provide an apparatus for accomplishing all the above mentioned desirable results and to provide a system and apparatus of this kind which is economical, durable and reliable in operation and inexpensive to manufacture.

For purposes of illustration of one system and apparatus of carrying out my invention, I have selected embodiments of the various features which are detailed in the accompanying drawing, in which:—

Fig. 1 illustrates an elevation, of a modern automobile with the invention applied thereto, part of the automobile being cut away to show the invention.

Fig. 2 shows in plan the automobile partly cut away to disclose the radial suction arms of the ventilating system.

Fig. 3 is a section along line 3—3 looking in the direction of the arrow.

Figs. 4 and 5 are fragmentary detail views of the suction hub which supports the radial suction arms.

Fig. 6 is a fragmentary detail view in section of the manually controlled valve.

My invention has particular utility in an automobile body of the type shown in Fig. 1 and denoted generally by 1. There are various types of such bodies. They are known as sedans, limousines, coupés, broughams, phaetons and in general are characterized by the fact that the occupants in the interior of such bodies are completely enclosed. The atmosphere within such bodies becomes quickly surcharged with obnoxious elements, enumerated heretofore, unless the windows 2 of the body are opened. Obviously in cold weather such expediencies are accompanied with discomfort. Again dust accumulates within the interior of a closed body, quickly on an extended trip. While not of themselves serious defects, modern standards and taste demand comfort to the extreme limit in automobile body ventilation and temperature.

Now, I have discovered that by utilizing the cylinder suction of the engine 3 in the engine compartments of the car I can positively replenish the air within the closed body or passenger compartment without subjecting the occupants thereof to cold, dust or odoriferous objections. To the carburetor 4 I affix a length of piping 5 and extend the piping into the closed body. The piping 5 is attached as at 6 to the usual carburetor air intake. The piping may be made of metal, or rubber or any material suitable for the purpose.

As shown in Fig. 1, the piping 5 extends along the interior of the body wall 11 and may be tapped by an auxiliary piping 12 leading into the bottom of the seat 7. It will thus be noted that air sucked into the conduit 12 must first pass thru the seat cushion 13 thus filtering the air. It is to be understood that this auxiliary piping may lead into any of the seats within the closed body. Of course auxiliary conduits 5 may even lead into a seat, beneath the cushion, exposed to the air constantly. The main purpose in such case being to eliminate the foreign bodies from the air, sucked into the conduit 12, then drawn through the piping 5 and finally educed into the carburetor 3. And the auxiliary conduits may even lead into the passenger compartment or dashboard exposed to the air constantly.

In Fig. 3, it is observed that the piping 5 leads into the spaces 9 between the rafters 15 of the roof frame. A hollow hub 8 disposed within one of the spaces 9 is affixed to the piping 5 and has affixed thereto along its periphery tubular arms 10 that radiate therefrom and feed into each roof space 9. Here again the hub 8 and arms 10 may be made of any well known material, such as metal or rubber, suitable for the purpose. It is obvious that air withdrawn from the body interior 16 into the tubular arms must first pass through the fabric 14 which serves as the ceiling of the interior of the car.

It will be obvious that when the car is being driven at a fairly high rate of speed on a cold day, that due to the enormous quantity of air consumed by the carburetor, that there will be a rapid change of air in the passenger compartment. Even if the windows are shut and the doors closed, the suction through the conduit 5 will be so great as to educe cold air through door cracks and thus cause the passenger compartment to become cold in a short time. The greater the speed of the car, the greater would be this influx of cold air.

Now, I have provided against this rapid influx of air into the passenger compartment while driving on a cold day by tapping the main conduit 5 with a T elbow 17 as shown in Fig. 6. A short pipe 18 is affixed to the elbow and houses therein a butterfly valve 19. Levers 21 and 20 are attached in any well-known mechanical manner to the valve 19 and the hand lever 22, so that the valve 19 may be remotely controlled by motion of the lever 22. Of course the lever 22 may be attached at any point on the dashboard convenient to the autoist. I am not limited in the location of the valve, nor in the design thereof. It may be arranged at any point along the conduit 5 in the engine compartment.

The operation of the invention is apparent. The cylinder suction of the engine in the engine compartment automatically withdraws the air surrounding the outlets of the piping. Before the air reaches the carburetor intake 6 it is thoroughly filtered and freed from dust and the like objectionable substances. Fresh air is constantly supplied from the exterior of the car without opening the windows widely. A mere crack is sufficient. The atmosphere within the closed car has no chance in this way to become foul, humid or dusty. And simultaneously with this ventilating action, the exhausted air is filtered, by the body itself, and fed to the carburetor in a warmed or semi-warmed state thus greatly improving vaporization of the gasoline. Of particular importance is the fact that no drafts are created, the intake and withdrawal of air relative to the body being responsive only to a positive and constant cylinder suction.

As pointed out above, while driving on a cold day, the lever 22 would be adjusted so as to open the valve 19 so that a part of the air drawn into the carburetor would be educed from the atmosphere direct thru 18. The remainder would be drawn from the passenger compartment. The arrows in Fig. 6, show the flow of air in such a case. Thus by varying the valve 19, a simple and extremely handy means is provided to lessen the air demand on the passenger compartment on a cold day as the car speeds are increased and the carburetor requires more air.

Of course, I am not limited to the use of the roof fabric and seat cushions as filtering material. It is within the scope of my invention to insert filtering material within the piping itself, as for instance in the valve piping 18. Neither do I limit myself to the carburetor air intake as the attaching point for the piping. The piping may be affixed to the manifold, as an alternative. It should also be noticed that when used on an open body car, my device serves to feed filtered air to the carburetor. Once the curtains are drawn on such an open body car, as a touring car, the ventilating action is secured in addition to the filtering action.

It will thus be apparent that I have not only secured a novel system of ventilating the passenger compartment of an automobile by withdrawing air therefrom into the engine compartment, but I have devised means to utilize such withdrawn air in carburetion, and in addition provided a control for such withdrawal which is readily accommodated to variation in speed of the car and temperature of the atmosphere.

As many apparently widely different embodiments of this invention may be made without departing from the spirit thereof, it will be understood, that I do not intend to limit myself to the specific embodiment herein set forth except as indicated in the appended claims.

Having thus described my invention what I claim and desire to protect by Letters Patent is:—

1. An automobile of the class described, comprising, in combination with the carburetor of the engine thereof, a main conduit connected to said carburetor and disposed within the interior of the body of said automobile, auxiliary conduits associated with said main conduit cooperating with independent portions of said body forming the spaces between the rafters of the roof frame and bounded on the lower side thereof by the fabric forming the ceiling of the interior of the car and cooperating with said fabric to withdraw air from said interior through said portions whereby the air is effectively filtered, the cylinder suction of said engine being adapted to positively and constantly draw said air through said conduits to said carburetor, whereby the interior of said body is ventilated and said filtered air is utilized for carburetion.

2. An automobile of the closed type comprising, in combination with the engine thereof, means associated with said engine and disposed within the interior of the seat of the body of said automobile and cooperating with the seat cushion of said body to withdraw air from said interior through said cushion, whereby the air is effectively filtered, the cylinder suction of said engine being adapted to positively and constantly draw said air through said means, whereby the interior of said body is ventilated.

3. A method of the class described, which consists in replenishing the air within the interior of a closed car by passing said air through the fabric forming the ceiling of the interior of the car, thereby filtering said air, and then passing said air to the carburetor of the engine of said car.

4. A method of the class described, which consists in replenishing the air within the interior of a closed car by passing said air through the seat cushion, thereby filtering said air, and then passing said air to the carburetor of the engine of said car.

5. In an apparatus of the class described a pipe, communicating with the carburetor of the engine of an automobile and having thereon a part, disposed along the side of the automobile, a branch, communicating with said part and extending upwardly to the spaces, enclosed between the rafters of the roof frame and bounded on the lower side thereof by the fabric, forming the ceiling of the interior of said automobile, and radiating tubular arms extending from said branch to feed into each of said spaces, whereby air is withdrawn from the interior of the automobile by the suction of said engine and is filtered by said fabric, whereupon said air is drawn into the carburetor of said engine.

Signed at New York in the county of New York and State of New York this 29th day of October, A. D. 1928.

RAYMOND E. CALLER.